(12) United States Patent
Castleberry et al.

(10) Patent No.: US 9,924,794 B2
(45) Date of Patent: Mar. 27, 2018

(54) PLATFORM FOR ELECTRONIC DEVICES

(71) Applicants: Mark Castleberry, Arlington, TX (US); Michael L. Arnold, Arlington, TX (US); George W. Jensen, Southlake, TX (US)

(72) Inventors: Mark Castleberry, Arlington, TX (US); Michael L. Arnold, Arlington, TX (US); George W. Jensen, Southlake, TX (US)

(*) Notice: Subject to any disclaimer, the term of this patent is extended or adjusted under 35 U.S.C. 154(b) by 0 days.

(21) Appl. No.: 15/146,023

(22) Filed: May 4, 2016

(65) Prior Publication Data

US 2017/0318959 A1    Nov. 9, 2017

(51) Int. Cl.
| | | |
|---|---|---|
| *A47B 97/04* | (2006.01) | |
| *A47B 23/00* | (2006.01) | |
| *F16M 13/04* | (2006.01) | |
| *A45F 5/00* | (2006.01) | |

(52) U.S. Cl.
CPC ............ *A47B 23/002* (2013.01); *A45F 5/00* (2013.01); *F16M 13/04* (2013.01); *A45F 2005/006* (2013.01); *A45F 2200/0516* (2013.01); *A45F 2200/0525* (2013.01)

(58) Field of Classification Search
CPC ............ A47B 23/002; A47B 2023/045; A47B 23/042; A45F 5/00; A45F 2005/006; A45F 2200/0516; A45F 2200/0525; A47F 5/01; A47F 5/13; E05D 11/10; E05D 11/105; E05D 11/1078; F16M 13/04
USPC ........ 248/444, 447, 454–456, 465.1; 16/373, 16/328, 329, 330–332; 40/749, 756
See application file for complete search history.

(56) References Cited

U.S. PATENT DOCUMENTS

| | | | | |
|---|---|---|---|---|
| 925,284 | A | * | 6/1909 | Buck ................. A47B 23/046 108/43 |
| 1,166,702 | A | * | 1/1916 | Mardon ............. E05D 11/1078 16/329 |
| 1,258,120 | A | * | 3/1918 | Kaplan .............. A47B 23/043 248/456 |
| 3,750,312 | A | | 8/1973 | Bucher |
| 281,937 | A | | 12/1985 | Roczey |
| D286,711 | S | | 11/1986 | Roczey |
| 4,925,146 | A | * | 5/1990 | Hegarty ................ A47B 19/10 248/447 |
| 5,207,791 | A | | 5/1993 | Scherbarth |
| 5,884,888 | A | | 3/1999 | Grimes, III et al. |

(Continued)

FOREIGN PATENT DOCUMENTS

DE          671474      2/1939

OTHER PUBLICATIONS

Make Life Easier®, Hands-Free Book Holder, http://www.make-life-easier.com/product/travel+%26+auto/travel/travelbrookrest.do?search=basic&keyword=16-48148-3&sortby=newArrivals&page=1, Retrieved May 4, 2016, 1 page.

(Continued)

*Primary Examiner* — Christopher Garft
(74) *Attorney, Agent, or Firm* — Haynes and Boone, LLP (57) ABSTRACT

A platform apparatus is provided which may be configured to support an electronic device. The platform apparatus may include a base, an extension, a support, and a lockable hinge. The extension may be adjustable and locked into a number of configurations. The platform apparatus may be configured for use by a standing, seated, or reclining user, or to support an electronic device in a free-standing configuration.

20 Claims, 11 Drawing Sheets

(56) References Cited

U.S. PATENT DOCUMENTS

| | | | |
|---|---|---|---|
| 6,116,165 | A | 9/2000 | Kadesky |
| 6,604,783 | B2 | 8/2003 | Goodson |
| 7,543,785 | B1* | 6/2009 | Liles ..................... G09F 7/18 |
| | | | 248/175 |
| 8,186,530 | B2* | 5/2012 | Bar ..................... B65D 71/70 |
| | | | 108/43 |
| 8,418,629 | B2 | 4/2013 | Yu |
| 8,651,446 | B2 | 2/2014 | Lausell |
| 8,746,156 | B2 | 6/2014 | Camarillo |
| 9,062,819 | B1 | 6/2015 | Chen |
| 2013/0187024 | A1* | 7/2013 | Obujen ............... A47B 23/002 |
| | | | 248/693 |

OTHER PUBLICATIONS

Make Life Easier®, Hands-Free Magnifier with Folding Legs, http://www.make-life-easier.com/product/health+%26+personal+care/visual+aids/handsfreemagnifierwithfoldinglegs.do?search=basic&keyword=18-39928-7&sortby=newArricals&page=a, Retireved May 4, 2016, 1 page.

Make Life Easier®, Portable Work Surface, http://www.make-life-easier.com/product/housewares/indoor+functional/laptraywithfoldinglegs.do?search=basic&keyword=16-35874-9&sortby=newArrivals&page=1, Retrieved May 4, 2016, 1 page.

International Searching Authority/United States Patent Office, "Notification of Transmittal of the International Search Report and The Written Opinion of the International Searching Authority, or the Declaration," for PCT/US17/30803, dated Sep. 14, 2017, 11 pages.

* cited by examiner

PLATFORM FOR ELECTRONIC DEVICES

TECHNICAL FIELD

The devices disclosed herein relate generally to platforms that may be used with electronic devices.

BACKGROUND

The widespread use of electronic devices, such as computer tablets, has created a need for accessories to increase productivity and convenience. One type of commonly-used accessory is a stand, which may allow a user to support a device close at hand without having to physically hold it. Conventional stands designed for use with electronic devices are generally rigid and static. Some conventional stands include a platform to support an electronic device. Although some conventional stands may be designed to rest on a user's lap, a rigid platform component may be uncomfortable and unstable. Furthermore, many conventional stands lack a device to secure them to a user's body. Another feature of many stands is a support member. Although some conventional stands have a movable support (such as a kickstand), most movable supports are either locked into one or two static positions or are freely movable. This makes incremental, secure adjustments to a stand difficult for a user. Accordingly, needs exist for a simple, adjustable platform that does not require a user to hold.

SUMMARY

The devices disclosed herein relate generally to platforms that may be used with electronic devices. A platform apparatus is provided which may include: a base having a first end; a rest which may be disposed on the base adjacent to the first end and configured to contact an electronic device; and an extension which may include a proximal end and a distal end, wherein the proximal end of the extension may connect to the first end of the base such that the extension extends out from the platform base, the extension further including a neck disposed between the proximal and distal ends, wherein the neck may include edges that form: an upper portion configured to contact a top portion of a user's legs; and a lower portion which may be configured to contact a bottom portion of a user's legs; wherein the extension may be configured to act as a fulcrum to balance the platform apparatus against a user's legs.

In some implementations, the distal end of the extension has a larger width than the neck. The platform apparatus may include lateral supports extending out from opposing sides of the base in a direction substantially transverse to the extension. In some implementations, the base and the extension are formed from a material comprising wood, metal, or plastic. The base and the extension may be formed from a same material. The base and the extension may be formed from a single, rigid body.

In some implementations, a platform apparatus for supporting electronic devices is provided, including: a base having a first end; a rest which may be disposed on the base adjacent to the first end and configured to contact an electronic device, the rest configured to contact a top portion of a user's legs; a lockable hinge connected to the first end; and an extension which may include a narrow neck and an end member wider than the neck, wherein the neck is connected to the lockable hinge and connected to the end member, wherein the neck may further include a lower portion configured to contact a bottom portion of a user's legs; wherein the extension may be configured to act as a fulcrum to balance the platform apparatus against a user's legs.

In some implementations, the neck and the end member are formed from a same material. The neck and the end member may be formed from a single piece of metal. The neck may include two arcuate edges disposed on opposite sides of a longitudinal axis of the extension. In some implementations, the arcuate edges curve outwards and away from the longitudinal axis. The lower portions of the arcuate edges may curve forward and away from the longitudinal axis.

In some implementations, the platform apparatus may include a strap connected to the base. Two connectors may be included which connect to the base, wherein the strap is secured to the connectors.

In some implementations, the lockable hinge further includes a first inner member, a second inner member, a first casing, a second casing, and a third casing. The first inner member may be disposed within the first casing and secured by the third casing, wherein the second inner member may be removably disposed within the second casing. The first and second inner members may have an exterior with a plurality of flat surfaces, the first and second inner members having a polygonal cross-section.

In some implementations, the lockable hinge is structurally arranged to be moved from a first configuration to a second configuration by compressing two arcuate edges of the neck together, releasing the second inner member from the second casing, rotating the first and second inner members from a first position to a second position, decompressing the two arcuate edges, and inserting the second inner member into the second casing.

In some implementations, the first and second casings have a cylindrical exterior and a hollow interior comprising a plurality of flat surfaces. The first and second inner members may have a hexagonal cross-section and the first and second casings have a hollow hexagonal interior.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the accompanying drawings and the following detailed description.

BRIEF DESCRIPTION OF THE DRAWINGS

The accompanying drawings illustrate implementations of the devices and methods disclosed herein and together with the description, serve to explain the principles of the present disclosure.

The accompanying drawings may be better understood by reference to the following detailed description.

DETAILED DESCRIPTION

For the purposes of promoting an understanding of the principles of the present disclosure, reference will now be made to the implementations illustrated in the drawings. Specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure. For simplicity, in some instances the same reference numbers are used throughout the drawings to refer to the same or like parts.

The present disclosure relates generally to devices, systems, and methods relating to platforms for supporting electronic devices, such as tablets, computers, and cellular devices, and other objects, such as books and clipboards. The present disclosure may offer benefits over conventional support devices. First, many conventional support devices require a user to hold them with his or her hands. In contrast, the platforms of the present disclosure allow a user to comfortably support an electronic device without using his or her hands, freeing the user's hands to type, control the device, or rest.

In addition, the platforms of the present disclosure are suitable for use in a number of configurations convenient for a user who is sitting, standing, or reclining. The platforms of the present disclosure may also be suitable for free-standing use on a flat surface. Furthermore, the platforms of the present disclosure may allow a user to simply adjust the tilt angle and placement of electronic devices. In particular, some implementations of the present disclosure include a locking hinge that may provide simple, secure adjustment of the platform.

Figure 1:
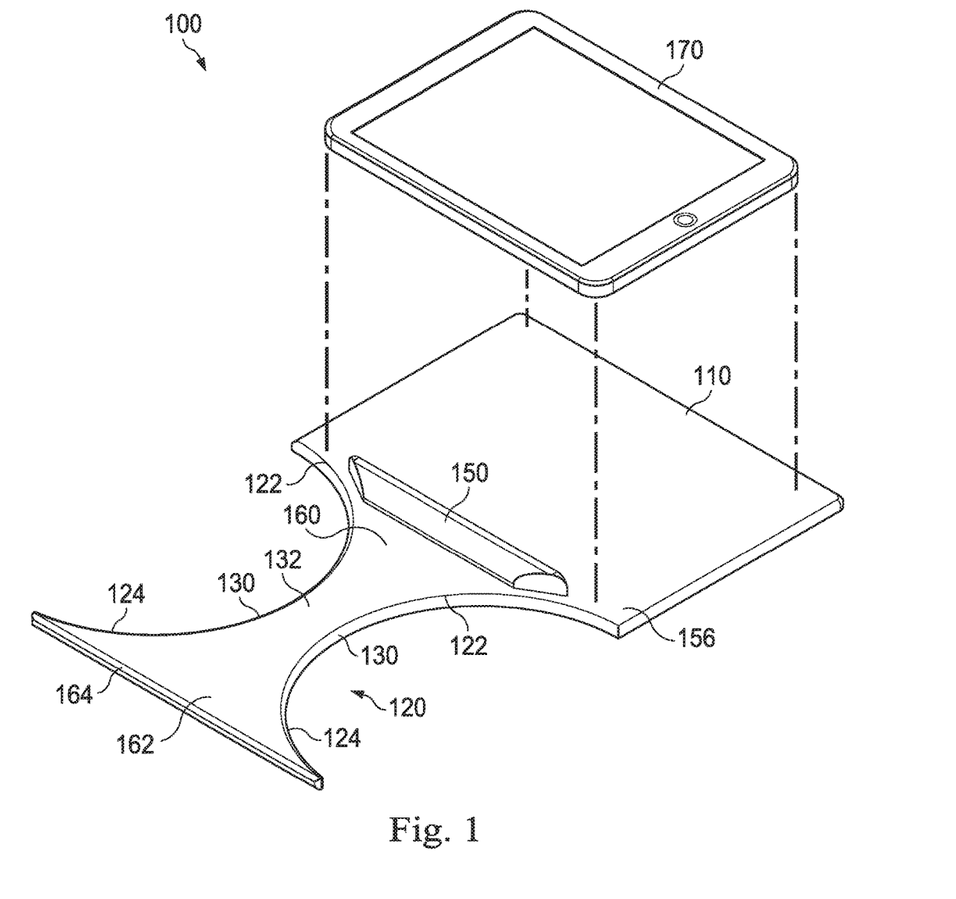
FIG. 1 illustrates a perspective view of an exemplary platform apparatus and an electronic device to be held on the platform apparatus.

FIG. 1 illustrates a perspective view of an exemplary platform apparatus 100 with an electronic device 170. The platform apparatus 100 may include a base 110, an extension 120, and a rest 150. The platform apparatus 100 may be designed to hold, support, or carry the electronic device 170. In the example of FIG. 1, the electronic device 170 is a tablet or tablet computer. However, the platform apparatus 100 may be used with electronic reading devices, mobile phones, smartphones, laptop computers, handheld gaming devices, navigation devices, and other portable electronics. Furthermore, the platform apparatus 100 may be configured for use with other objects that do not include electronic components, such as books, clipboards, notebooks, pads of paper, and art supplies. Furthermore, the platform apparatus 100 as described herein may be used by a user who requires a flat surface for using electronic devices or writing.

The base 110 may be generally flat and provides a surface upon which to place objects such as an electronic device 170. The base 110 may include features (not shown) to support the electronic device 170, such as straps, clips, elastic bands, Velcro patches, or other securing devices. The base 110 may have rounded or rectangular corners. In some implementations, the base 110 may be designed to be roughly the same shape and size as the electronic device 170 used therewith. In the example shown in FIG. 1, the base 110 has a slightly larger area than the electronic device 170. This may provide sufficient support for the electronic device 170. In other implementations, the base 110 may have other shapes.

The rest 150 may be disposed on the base 110. The rest 150 may be configured to support the electronic device 170 or other device while the platform apparatus 100 is in use. In some implementations, the rest 150 has a wedge shape with an upper flat section. This shape may be useful to support the electronic device 170 when the platform apparatus 100 is used in a vertical orientation or at a titled angle. That is, the rest 150 may act as a stop or shelf that the electronic device 170 may abut against to keep the electronic device 170 on the base 110. In other implementations, the rest 150 has a rectangular or an elliptical cross-section. In the example of FIG. 1, the rest 150 is disposed at a bottom portion 156 of the base 110 above the extension 120. Here, the extension 120 does not extend beyond edges 130 or the sides of the base 110. In other implementations, the rest 150 extends past the edges 130 and/or the sides of the base 110. The rest 150 may also fold up so as to lie flush against the base 110. In some implementations, the base 110 includes a recessed area configured to receive the rest 150 in a folded configuration. The base 110 may also include a recessed portion on a back surface that is configured to receive the rest 150 of another platform apparatus 100 to facilitate stacking.

The base 110 may be connected to the extension 120. In the example of FIG. 1, the base 110 and the extension 120 are formed from a single piece of rigid, flat material. However, in other implementations, the extension 120 is a separate device and is attached to the base 110 by a connection such as a fixture or hinge. Other examples of extensions 120 will be discussed with reference to FIG. 4. The extension 120 may include a proximal end portion 160, a distal end portion 162, and a neck 132 with edges 130. In some implementations, the proximal end portion 160 connects to a bottom portion 156 of the base 110 and the extension 120 extends out and away from the base 110. In some implementations, such as the example of FIG. 1, the extension 120 is coplanar with the base 110. In other implementations, the extension 120 extends out from the base 110 at an angle to the base 110 and is not coplanar.

In some implementations, the edges 130 are disposed between the proximal end portion 160 and the distal end portion 162. In the implementation shown, the edges 130 may have arcuate shapes that are configured to accommodate the legs of a user. In some implementations, the edges 130 are configured to loosely contact the legs of a user. The edges 130 may include an upper portion 122 and a lower portion 124. In some implementations, the upper portion 122 of the edges 130 may be configured to contact a top portion of a user's legs and the lower portion 124 of the edges 130 may be configured to contact a bottom portion of a user's legs. This implementation is discussed in further detail with reference to FIGS. 2 and 3. In some implementations, the edges 130 are configured to fit snugly around a user's legs.

In some implementations, the distal end portion 162 of the extension 120 has a distal end 164 and two outer pointed corners as shown in FIG. 1. The distal end 164 of the distal end portion 162 may be flat or slightly curved. This may allow the distal end portion 162 to rest beneath a bottom portion of a user's legs. The distal end portion 162 may have a greater width than the neck 132. The proximal end portion 160 may also have a greater width than the neck 132.

Figure 2:
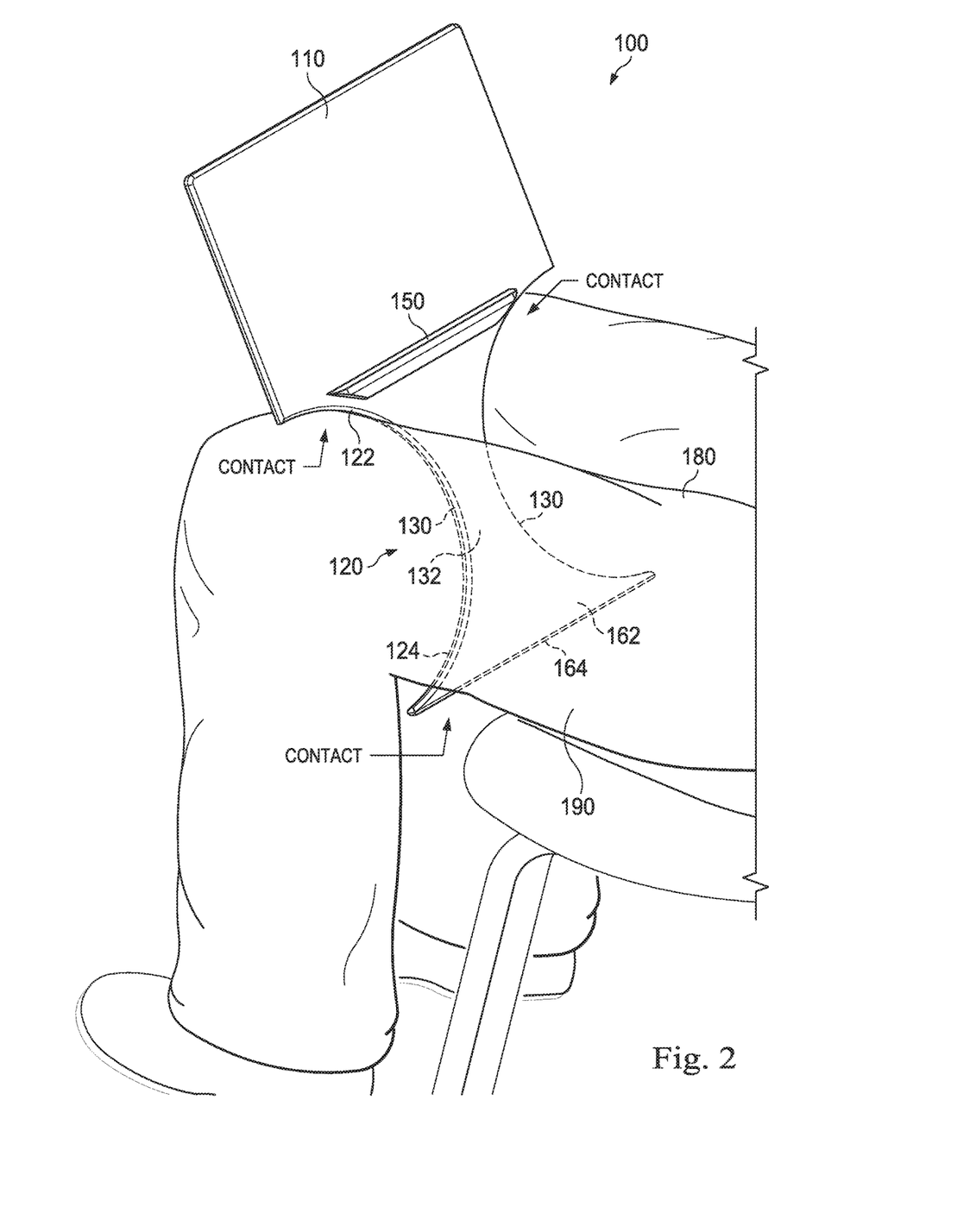
FIG. 2 illustrates an exemplary platform apparatus held by a user.

FIG. 2 illustrates a platform apparatus 100 being held by a user. In some implementations, such as the example of FIG. 2, the platform apparatus 100 is configured to be held on the lap of seated user and extend between the user's legs. The platform apparatus 100 may also be suitable for use by a reclining user or a user who is lying down. The platform apparatus 100 may allow a user to read or otherwise interact with an electronic device 170 without having to hold or support the electronic device 170 with his or her hands.

In some implementations, the platform apparatus 100 is configured to be held between the legs of a user. In particular, the extension 120 may extend between the legs of the user while the base 110 is held above the legs. The edges 130 of the extension 120 may contact the legs of the user in various ways. For example, the upper portion 122 of the edges 130 may contact a top portion 180 of a user's legs and the lower portion 124 of the edges 130 may contact a bottom portion 190 of a user's legs. In this way the platform apparatus 100 may act as a fulcrum and balance against the top portion 180 and bottom portion 190 of a user's legs to hold the platform apparatus 100 steady. In some implementations, a rest 150 may also contact a top portion 180 of the user's legs, which may help to provide a more stable support.

In some implementations, a user may be able to adjust a tilt angle of the base 110 by moving his or her legs closer together or further apart. In particular, the user may move his or her legs further apart, thereby creating lower contact points between the lower portion 124 of the edges 130 and the bottom portion 190 of the user's legs. The lower contact points may cause the base 110 to sit lower on the legs or to tilt backwards, allowing for easier viewing by a seated user. Likewise, a user may move his or legs closer together to more tightly hold the extension 120 between the legs, thereby moving the base 110 closer to a vertical configuration. In some implementations, moving the legs closer together may allow easier viewing of the electronic device 170 as shown in FIG. 1 on a platform apparatus 100 by a user who is reclined or lying down.

In some implementations, the weight of various elements of the platform apparatus 100 may impact the balance of the platform apparatus 100 as it supports the electronic device. In particular, various elements may be weighted so that the platform apparatus 100 naturally rests in a desired configuration. For example, the distal end portion 162 of the extension 120 may be weighted such that the platform apparatus 100 rests in more of a vertical configuration. Likewise, the base 110 may be weighted such that the platform apparatus 100 rests in a more tilted or reclined configuration. In some implementations, the distal end 164 of the distal end portion 162 of the extension 120 may be flat or slightly curved. This may allow the distal end 164 to rest securely against a chair or bed while the platform apparatus 100 is being held.

Figure 3:
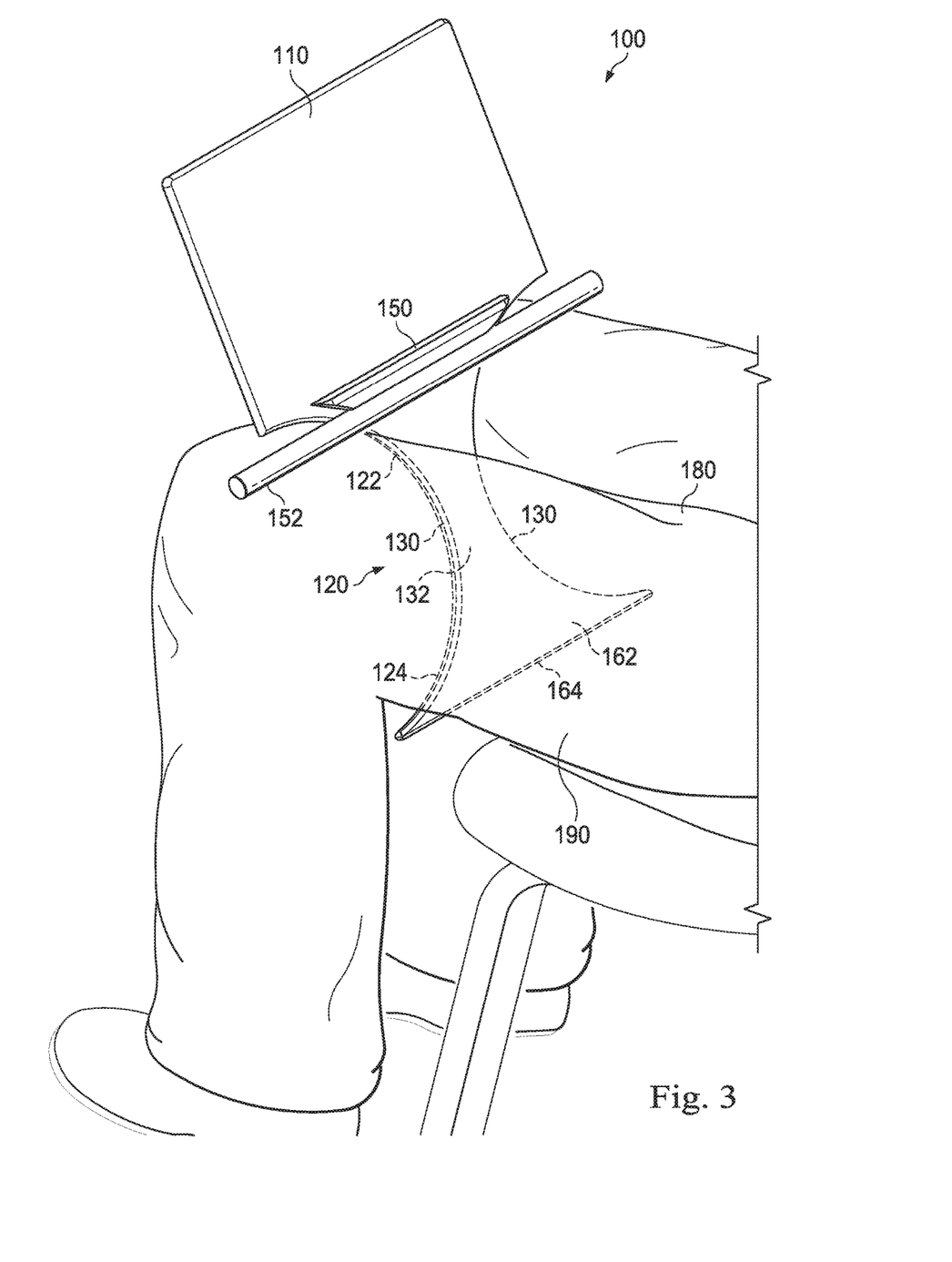
FIG. 3 illustrates an exemplary platform apparatus held by a user.

FIG. 3 illustrates another example of a platform apparatus 100 held by a seated user. In particular, lateral supports 152 may extend out from the outer edges of the base 110. The lateral supports 152 may provide additional support for the platform apparatus 100 by providing more surface area that may be in contact with a top portion 180 of a user's legs. In particular, the lateral supports 152 may allow a user to keep his or her legs further apart for comfort while still providing support for the platform apparatus 100. In some implementations, the lateral supports 152 are formed as part of the rest 150. The lateral supports 152 may also include a hinged portion that may allow the lateral supports 152 to fold out from the rest 150 or another component of the platform apparatus 100. In some implementations, the lateral supports 152 may be configured to secure an electronic table 170 or hold down the pages of a book that is supported by the platform apparatus 100.

Figure 4:
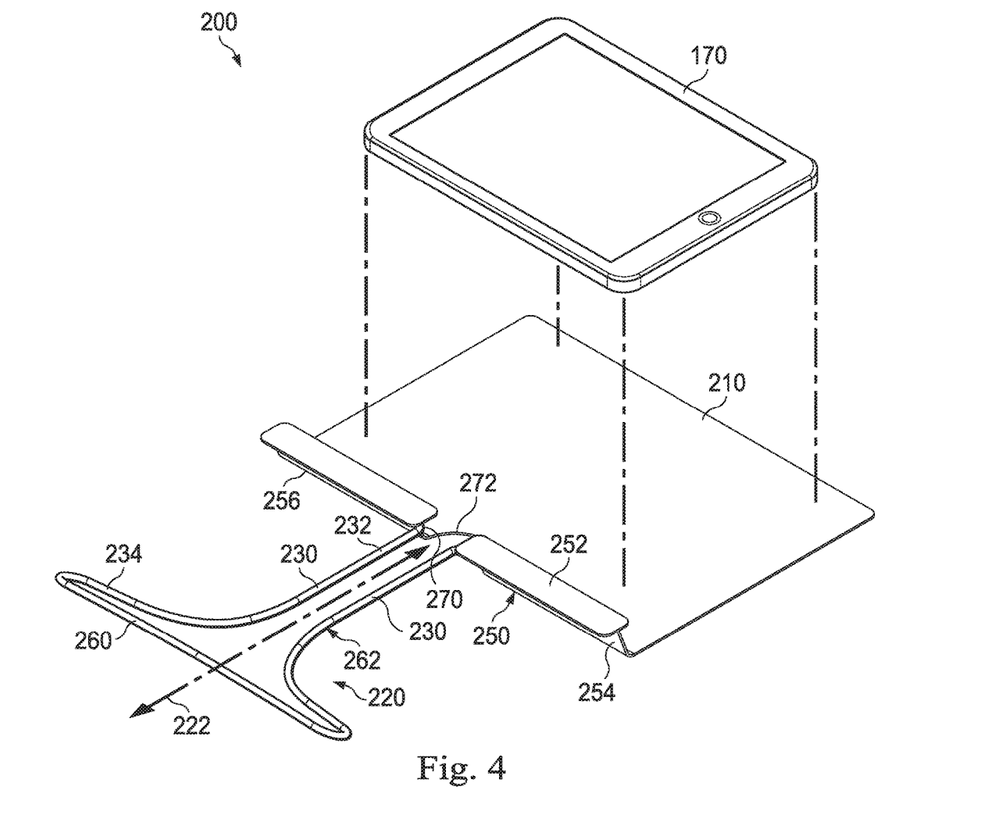
FIG. 4 illustrates a perspective view of an exemplary hinged platform apparatus.

FIG. 4 illustrates a perspective view of an exemplary hinged platform apparatus 200 for holding a device, such as the electronic device 170. The hinged platform apparatus 200 may include a base 210, an extension 220, and a hinge 270. The hinged platform apparatus 200 may have similar functions to the platform apparatus 100 and may be configured for use with the electronic device 170 or other objects such as books, clipboards, or art supplies, as discussed herein. Additionally, the hinged platform apparatus 200 may have additional configurations and functions related to an extension 220 which may be adjustable. These configurations and functions will be discussed in relation to FIGS. 5A-5C. In some implementations, the hinged platform apparatus 220 is adjustable to other desired configurations.

The base 210 of the hinged platform apparatus 200 may be similar to the base 110 of the platform apparatus 100. In particular, the base 210 may have a flat, planar shape. In some implementations, a bottom end 256 of the base 210 includes a notch 272 and a rest 250. The base 210 may comprise one or more materials including metal, wood, plastics, and other materials. In some implementations, the base 210 is formed out of a single metal sheet. In some implementations, a hinge 270 may be disposed on an end of the base 210. The hinge 270 may be movable, and in some implementations, lockable. The hinge 270 may connect the base 210 to an extension 220. In some implementations, the hinge allows the extension 220 to be pivoted and locked into a number of configurations as discussed with reference to FIGS. 5A-5C.

Figure 10:
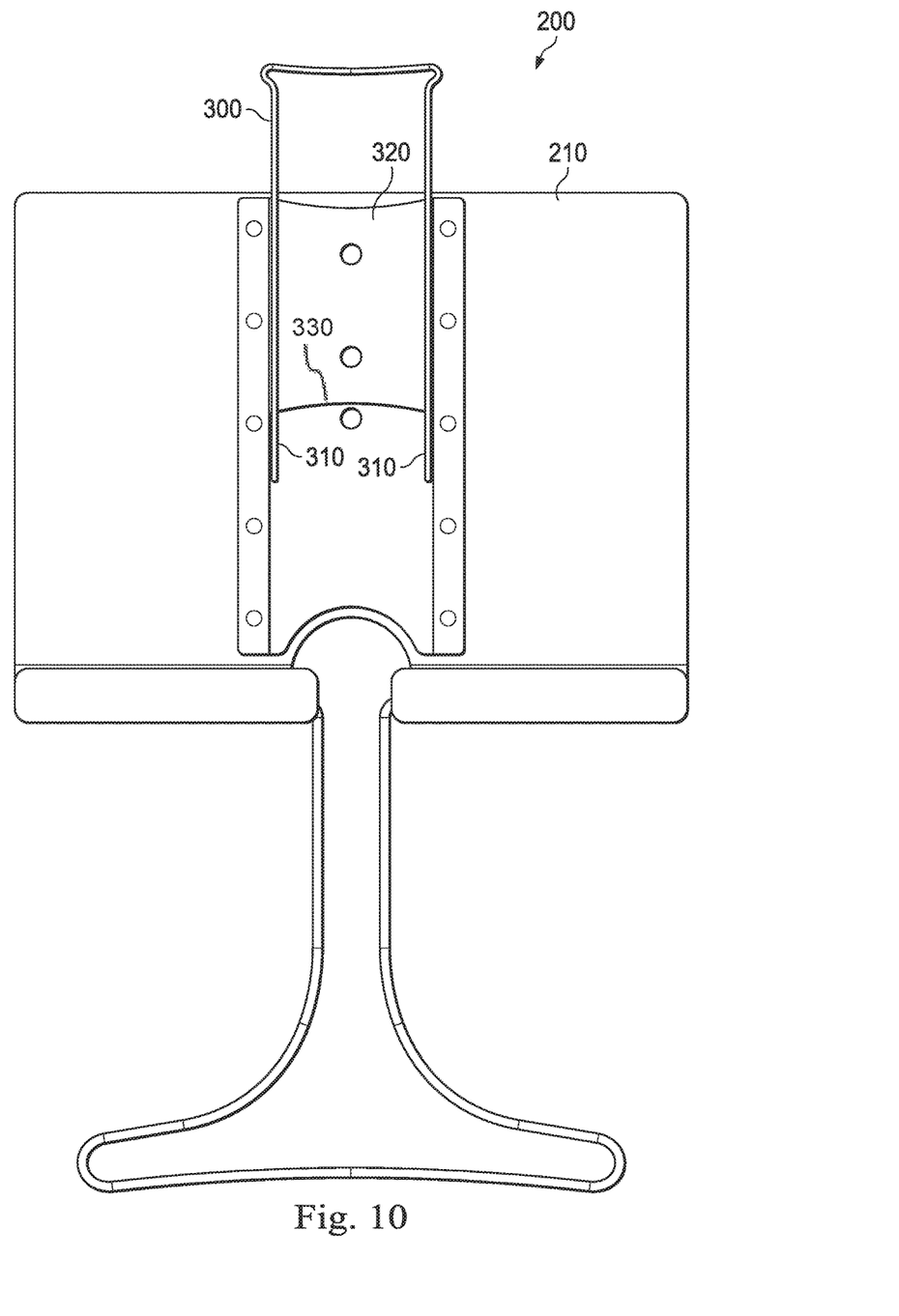
FIG. 10 illustrates an exemplary hinged platform apparatus with a clamp.

The rest 250 may function similarly to the rest 150 of FIGS. 1-3. The rest 250 may extend transverse to the planar portion of the base and may act as a stop or shelf that supports the electronic device 170. In some implementations, the rest 250 includes other securing features such as a flange or a set of posts which may further secure the electronic device 170. Here, the rest 250 includes a lip 252 that cooperates with the base 210 to create a notch 254 that may receive an edge of the electronic device 170. Furthermore, the base 210 and rest 250 may also include other features that are not shown, such as straps, elastic bands, Velcro patches, or other gripping features. The base 210 and rest 250 may also include other features to secure an electronic device 170 or other object, including recessed portions that may be fit to the size and shape of various objects, clamps, clips, tension devices, and rubberized portions. An exemplary clamp for securing the electronic device 170 is shown in FIG. 10.

In some implementations, the base 210 and rest 250 are formed from a single piece of material, which may any suitable material including metal, wood, plastics, or others.

In some implementations, the base 210 and rest 250 may be formed out of a single sheet of metal. In this case, the rest 250 may be formed by bending a bottom end 256 of the base 210 outwards.

Still referring to FIG. 4, the extension 220 can include a neck 262 with two edges 230 and an end member 260. In some implementations, the neck 262 has a smaller width than the end member 260. In some implementations, the edges 230 have an arcuate shape. The edges 230 may comprise proximal end portions 232 which may connect to the hinge 270. A distal end portion 234 of the neck 262 may attach to the end member 260.

The extension 220 may be centered on a longitudinal axis 222. In some implementations, the edges 230 extend straight out from the base 210 and curve outward and away from the longitudinal axis at their distal end portions 232. In some implementations, such as in the example of FIG. 4, the distal end portions 232 may also curve forward such that the end member 260 is not coplanar with the edges 230. In other implementations, the edges 230 and end member 260 are coplanar. The extension 220 may be formed out of any one or more materials, including metal, wood, and plastics. In the example shown in FIG. 4, the neck 262 is hollow and bounded by edges 230. In some implementations, the neck 262 is solid and may be formed out of metal, wood, plastic, or other materials. In some implementations, the extension 220 is formed from a single bent cylindrical piece of metal, such as a bar or rod. An end member 260 of the extension 220 may include a coating and/or padding configured to make contact with the user more comfortable.

In some implementations, the hinged platform apparatus 200 is configured to be used by a seated, reclining, or standing user. A seated or reclining user may use the hinged platform apparatus 200 in a manner similar to that shown in FIGS. 2 and 3. In particular, the hinged platform apparatus 200 may be held between the legs of a user. The distal end portion 234 of the neck 262 may contact a bottom portion of a user's legs and the proximal end portions 232 of the neck 262 and/or the rest 250 may contact a top portion of the user's legs. In some implementations, this configuration may create a fulcrum and allow the hinged platform apparatus 200 to balance against a user's legs. The use of the hinged platform apparatus 200 by a standing user will be discussed in relation with FIGS. 7, 8, 9A, and 9B.

Figure 5A:
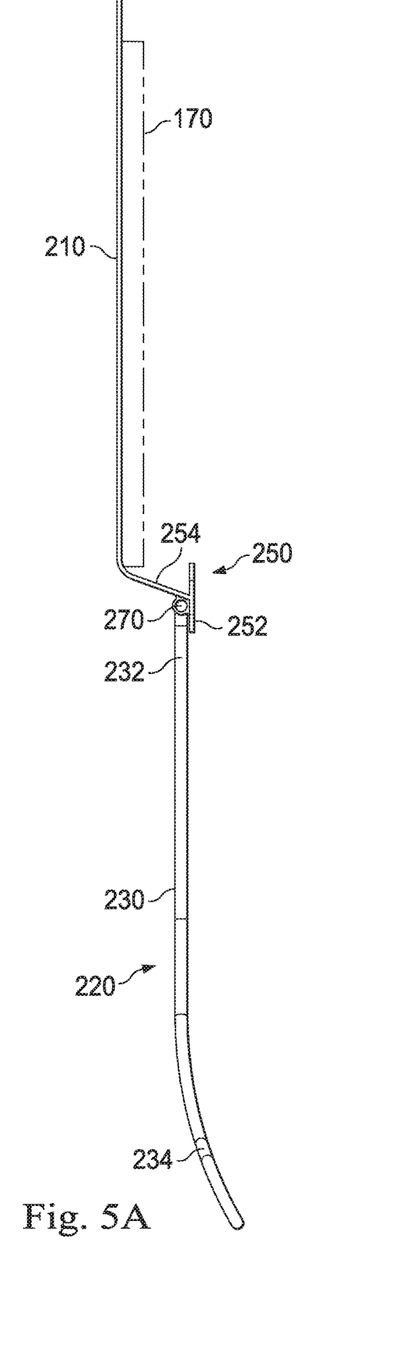
FIG. 5A illustrates a side view of an exemplary hinged platform apparatus in a first configuration.
Figure 5B:
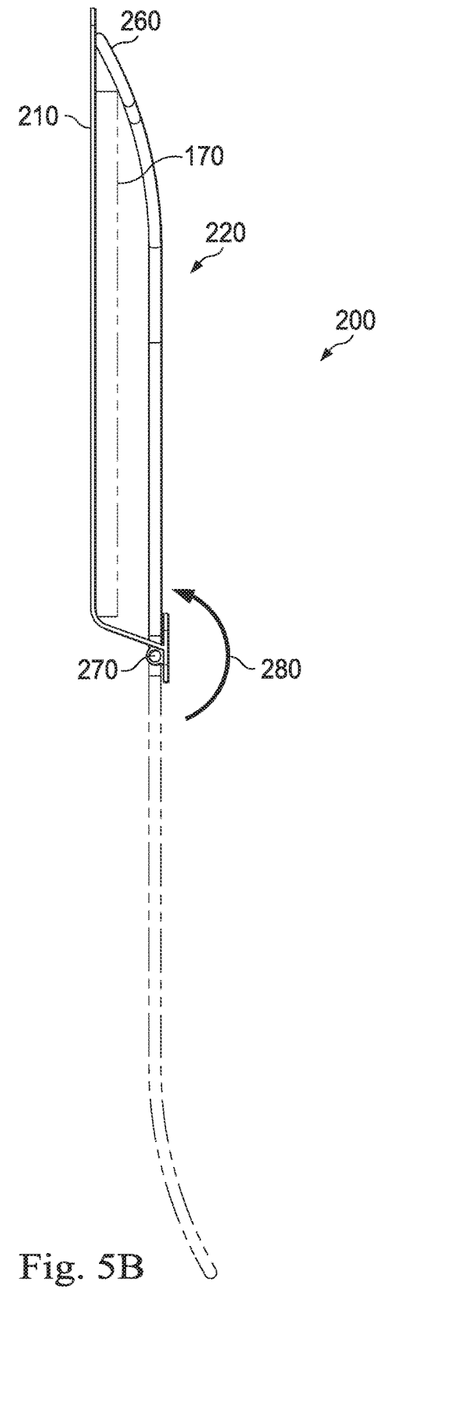
FIG. 5B illustrates a side view of an exemplary hinged platform apparatus in a second configuration.
Figure 5C:
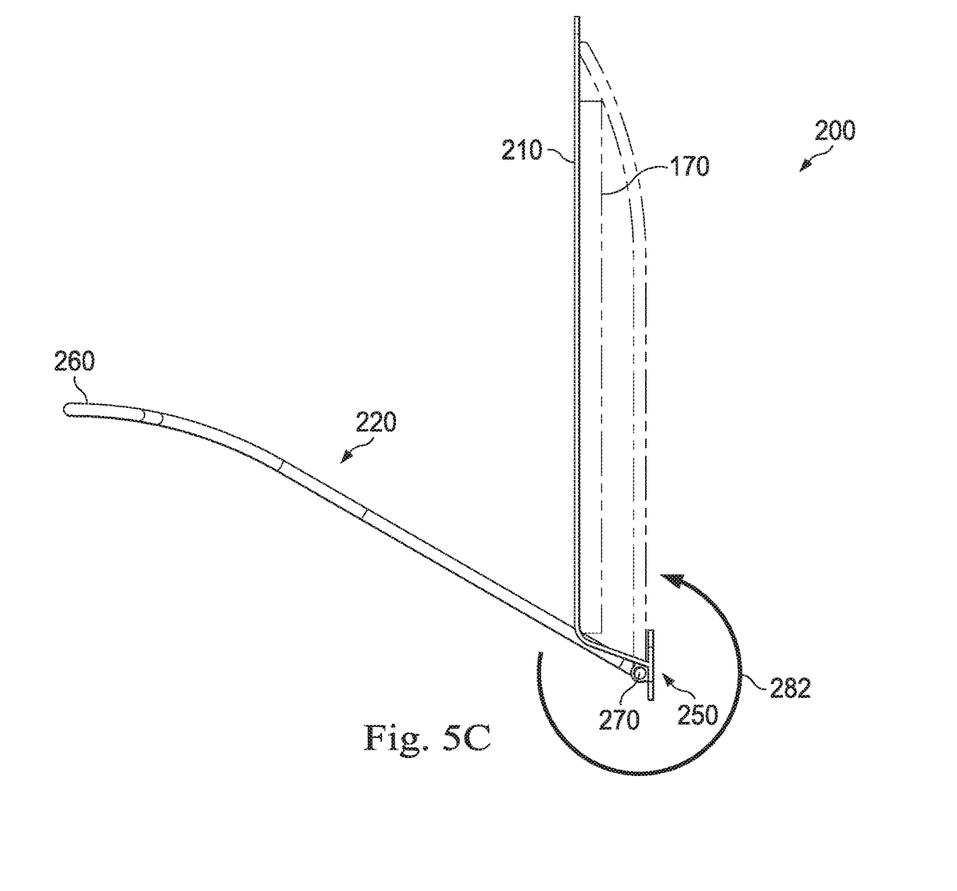
FIG. 5C illustrates a side view of an exemplary hinged platform apparatus in a third configuration.

In some implementations, the hinged platform apparatus 200 may be used in a number of configurations. For example, a first, a second, and a third configuration are shown in FIGS. 5A, 5B, and 5C, respectively. The configurations may involve the hinge 270 being locked in various positions. The electronic device 170 is shown in dotted lines for reference. FIG. 5A illustrates a side view of an exemplary platform in a first configuration. In the first configuration, the extension 220 may extend downwards from the base 210. The extension 220 may be roughly parallel to the base 210 and form a roughly vertical profile. The hinge 270, which may attach the extension 220 to the base 210, may be locked in a first position. In some implementations, the rest 250 may lend support to the extension 220 in this configuration. In particular, a proximal end portion 232 of the extension 220 may rest against the rest 250. It will be noted that the example of FIG. 5A shows the optional forward curvature of the distal end portion 234 of the extension 220. In some implementations, the angle that the distal end portion 234 curves forward is similar to the angle of the notch 254. This may help to stabilize the extension 220 and provide a comfortable fit for the user. In some implementations, the angle at which the distal end portion 234 curves away from the extension 220 is between 45° and 90°. The distal end portion 234 may curve away from the extension 220 with other angular measurements.

FIG. 5B illustrates a side view of the hinged platform apparatus 200 in a second configuration. In this configuration, the extension 220 has been folded up to a second configuration from the first configuration (which is shown in dotted lines) in direction 280 and is positioned over the base 210. In some implementations, the extension 220 is roughly parallel to the base 210 and the end member 260 of the extension 220 contacts an upper portion of the base 210. The contact between the base 210 and the extension 220 may lend support to the second configuration. The extension 220 may also be used to secure the electronic device 170 in place. In some implementations, the second configuration is used to store, transport, and/or protect an electronic device 170 that is held on the hinged platform apparatus 200. The second configuration may be used to decrease the size of the platform apparatus 200 and make it more portable. For example, in this folded configuration, it may easily fit within a backpack, luggage, satchel, book bag, and so on. Additionally, the folded extension 220 may help to secure the electronic device 170 and protect it from damage from external objects and from being crushed when carried in the backpack or other bag.

FIG. 5C illustrates a side view of the hinged platform apparatus 200 in a third configuration. In the third configuration, the extension 220 has been moved backwards in direction 282 and is positioned behind the base 210. Moreover, the hinge 270 may be locked in a third position in this configuration. The extension 220 may be supported by the lip 252 or notch 254 of the base 210 and/or by the rest 250. The hinged platform apparatus 200 may function as an easel in the third position. Furthermore, the hinged platform apparatus 200 may be placed on a flat surface. In this case, the end portion 260 of the extension 220 and the rest 250 may contact the flat surface and may act as a kickstand. Furthermore, the hinged platform apparatus 200 may be placed in the third configuration to hold an electronic device 170 at an angle to a table, desk, bed, or other flat surface for convenient viewing by a user. The third position may also be used when a user does not want to hold the hinged platform apparatus 200 between his or her legs.

Other configurations of the extension 220 are contemplated besides the three configurations discussed above. For example, the extension 220 may be locked at a slight angle to the base 210 as depicted in FIG. 9B. The extension 220 may be locked into various incremental positions to adjust the viewing angle of the electronic device 170. In some implementations, the extension 220 may be locked at an angle of 15-30 degrees.

Figure 6:
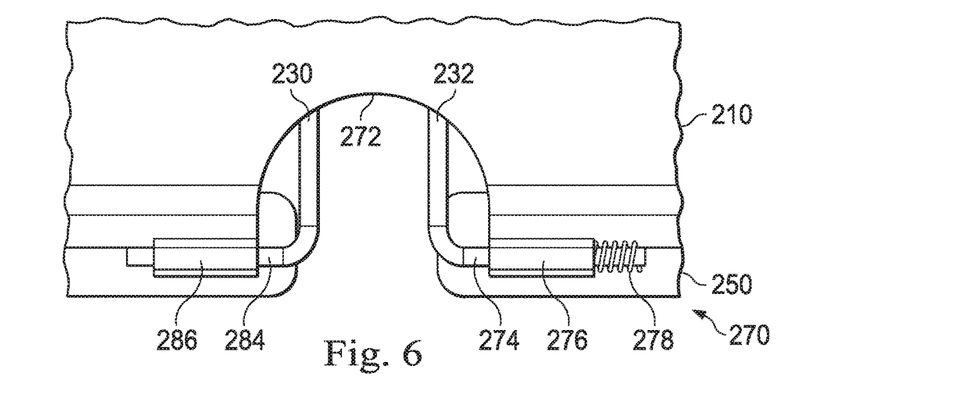
FIG. 6 illustrates a close up view of a hinge of the exemplary hinged platform apparatus.

FIG. 6 illustrates a close up view of an exemplary hinge 270. In some implementations, the hinge 270 includes a first inner member 274, a second inner member 284, a first casing 276, a second casing 286, and a third casing 278. In some implementations, the first inner member 274 is connected to a proximal end portion 232 of the extension 220. The first inner member 274 may have an outer surface comprising a plurality of flat surfaces and a polygonal cross section. In some implementations, the first inner member 274 has a hexagonal cross-section and in other implementations, the first inner member 274 has an octagonal cross-section. Other configurations are contemplated, such as the first inner member 274 having 4, 5, 7, 10, 12, or some other number of flat surfaces.

In some implementations, the first inner member 274 is configured to fit inside a first casing 276. The first casing 276 may have a hollow cylindrical shape with a cylindrical exterior. The interior of the first casing 276 may be configured to receive an object with a number of flat surfaces. In some implementations, the first casing 275 may include a number of flat surfaces on its interior. The first casing 276 may also include curved portions on its interior. In some implementations, the number and dimensions of the flat surfaces on the external surface of the first inner member 274 and the interior surface of the first casing 276 are approximately the same such that the first inner member 274 fits snugly within the first casing 276. In some implementations, the first casing 276 and the second casing 286 have hollow hexagonal interiors. In other implementations, the first and second casings 276, 286 have cylindrical or rounded interiors. The first and second casings 276, 286 may include internal or external mechanisms for gripping the first and second inner members 274, 284, such as springs or levers. A third casing 278 may be connected to the first inner member 274 and/or the first casing 276. In some implementations, the third casing 278 is configured to hold the first inner member 274 within the first casing 276. The third casing 278 may include a threaded exterior. These threads may be used with a securing device, such as a knob or stop, to secure the position of the inner member 274. The third casing 278 and the first casing 276 may be disposed on a back surface of the base 210. In some implementations, the third casing 278 has an interior that is configured to hold a first inner member 274 with a hexagonal shape. The hinge 270 may include other casings with various interior shapes. For example, a fourth casing may be connected to the second casing 284 with a mechanism that is configured to secure the second inner member 284.

In some implementations, a second casing 286 is disposed on a back surface of the base 210. The second casing 286 may be similar in shape to the first casing 276 and may have flat or curved surfaces on its interior. A second inner member 284 may be connected to a proximal end portion 232 of the extension 220. The second inner member 284 may be removably disposed within the second casing 286.

In some implementations, changing the position of the hinge 270 may include squeezing the edges 230 of the extension 220 together, which may pull the second inner member 284 out of the second casing 286. The extension 220 may then be rotated to a different orientation, which may provide a corresponding rotation to the first and second inner members 274, 284. The extension 220 may then be allowed to relax, and the second inner member 284 may elastically deform back to its biased position, which is back into the second casing 286. At this point, the first and second inner members 274, 284 may be locked into a new position within the first and second casings 276, 286, respectively. In some implementations, the position of the hinge 270 may be changed in other ways. For example, securing mechanisms may be placed on or within the first, second, and third casings 276, 286, 278 that may be configured to selectively secure and allow movement of the first and second inner members 274, 284.

Still referring to FIG. 6, the notch 272 is shown on the base 210. This notch 272 may be configured to accommodate the motion of the extension 220 as it is moved from one configuration to another configuration. In some implementations, the notch 272 has an arcuate shape, as shown in the example of FIG. 6. In other implementations, the notch 272 has a rectangular, polygonal, elliptical, or other shape. The notch 272 may be configured to support the extension 220 in various configurations.

Other configurations for the hinge 270 are contemplated. For example, the first and second inner members 274, 284 may have cylindrical outer surfaces. Instead of locking into the first and second casings 276, 286 by putting a number of flat surfaces in contact, the first and second inner members 274, 284 may be locked into place by one or more locking mechanisms such as a latch.

Figure 7:
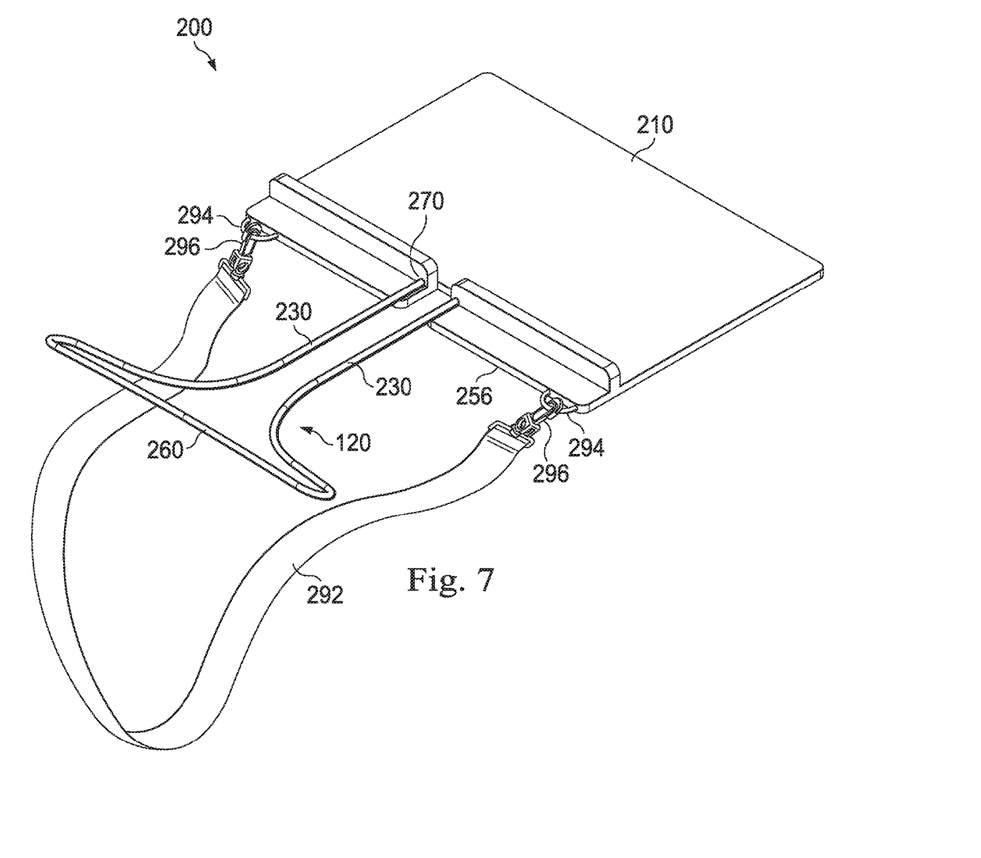
FIG. 7 illustrates a perspective view of an exemplary hinged platform apparatus with an attached carry strap.

The hinged platform apparatus 200 may be configured for use by a standing user. FIG. 7 illustrates a perspective view of the exemplary platform 200 including an attached carry strap 292. In some implementations, the carry strap 292 may be configured to be worn by a user around the neck or shoulder. The carry strap 292 may also be connected to a belt loop other area of clothing for support. The carry strap 292 may allow the hinged platform apparatus 200 to be supported without being held in the hands of a user. In some implementations, this configuration may be useful for users such as teachers, law enforcement officials, first responders, sales clerks, or others who may benefit by hands-free support of objects. The hinged platform apparatus 200 may be used to create a "power-zone," and may be used to call attention to the user and show authority.

In some implementations, the carry strap 292 is connected to the hinged platform apparatus 200 by two connectors 294. In the exemplary implementation shown, the connectors 294 may be placed on the bottom end 256 of the base 210. In some implementations, the connectors 294 have a ring or loop shape and the ends of the carry strap 292 have clips 296 configured to lock into the connectors 294. In some implementations, the clips 296 may be hooks, fasteners, or other types of locking mechanisms. In some implementations, the carry strap 292 is removable and it may be unclipped from the connectors 294 by unfastening the clips 296. The clips 296 of the carry strap 292 may be clipped onto other areas of the platform apparatus 200, such as the extension 220.

Figure 8:
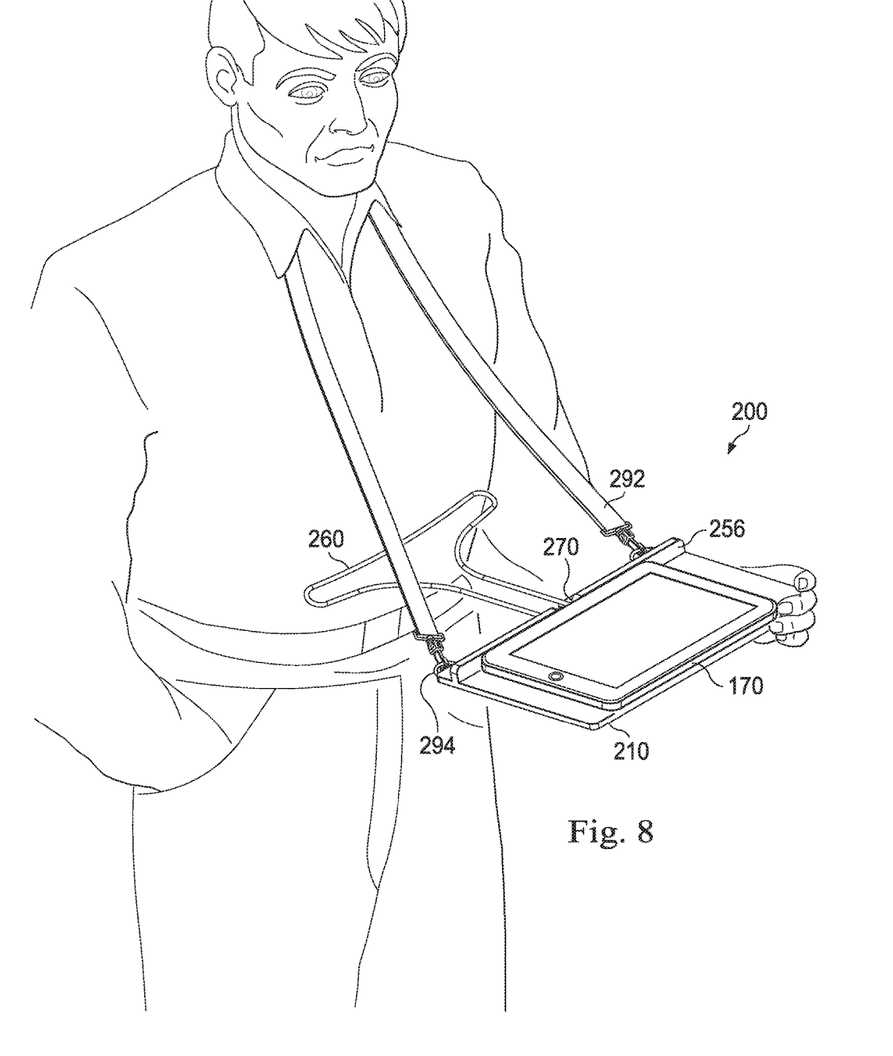
FIG. 8 illustrates an exemplary hinged platform apparatus held by a standing user.

FIG. 8 illustrates a hinged platform apparatus 200 being held by a standing user. In some implementations, the hinged platform apparatus 200 is held in a roughly horizontal configuration (also shown in FIG. 4) with the end member 260 of the extension 220 contacting the torso of the user. In some implementations, portions of the end member 260 and/or the carry strap 292 may be covered with padding to provide a more comfortable fit for the user.

The carry strap 292 may help to support the hinged platform apparatus 200 by holding up the base 210, and particularly, by applying tension to the base 210 through the connectors 294. In some implementations, the location of the connectors 294 may help balance the hinged platform apparatus 200. In particular, the placement of the connectors on the bottom end 256 of the base 210 may balance the hinged platform apparatus 200. In some implementations, the connectors 294 may be movable so that the hinged platform apparatus 200 may be balanced in other configurations.

Figure 9A:
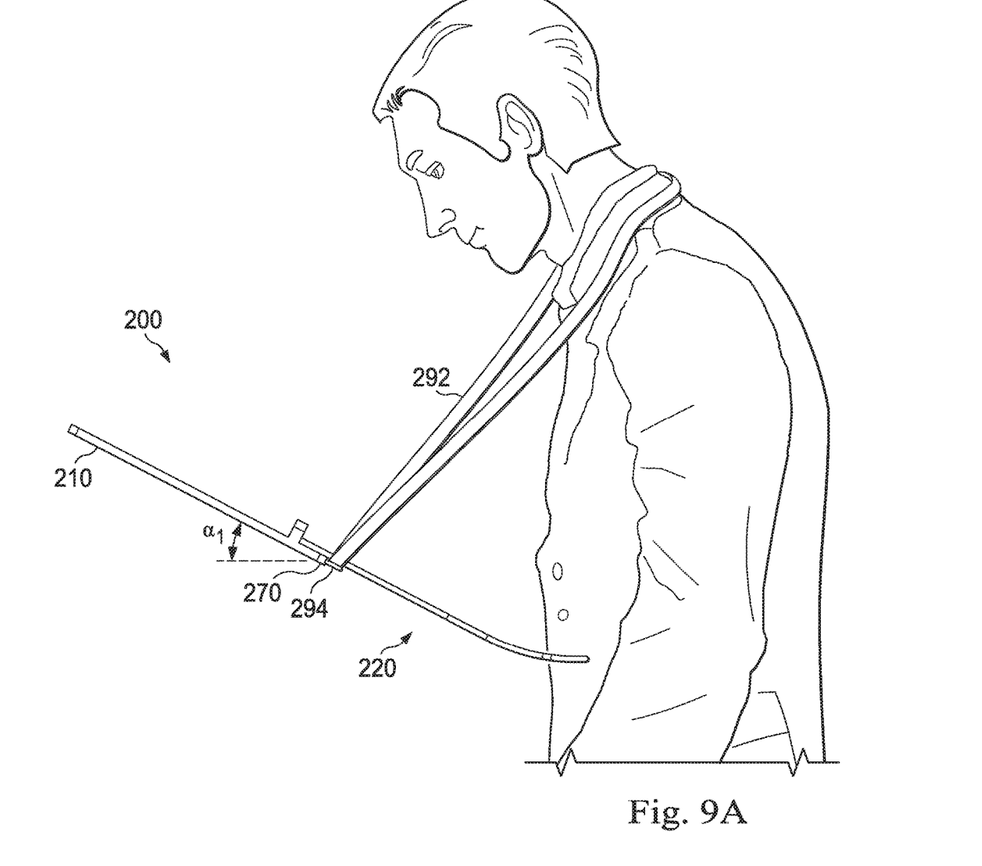
FIG. 9A illustrates an exemplary hinged platform apparatus held by a standing user in a first configuration.
Figure 9B:
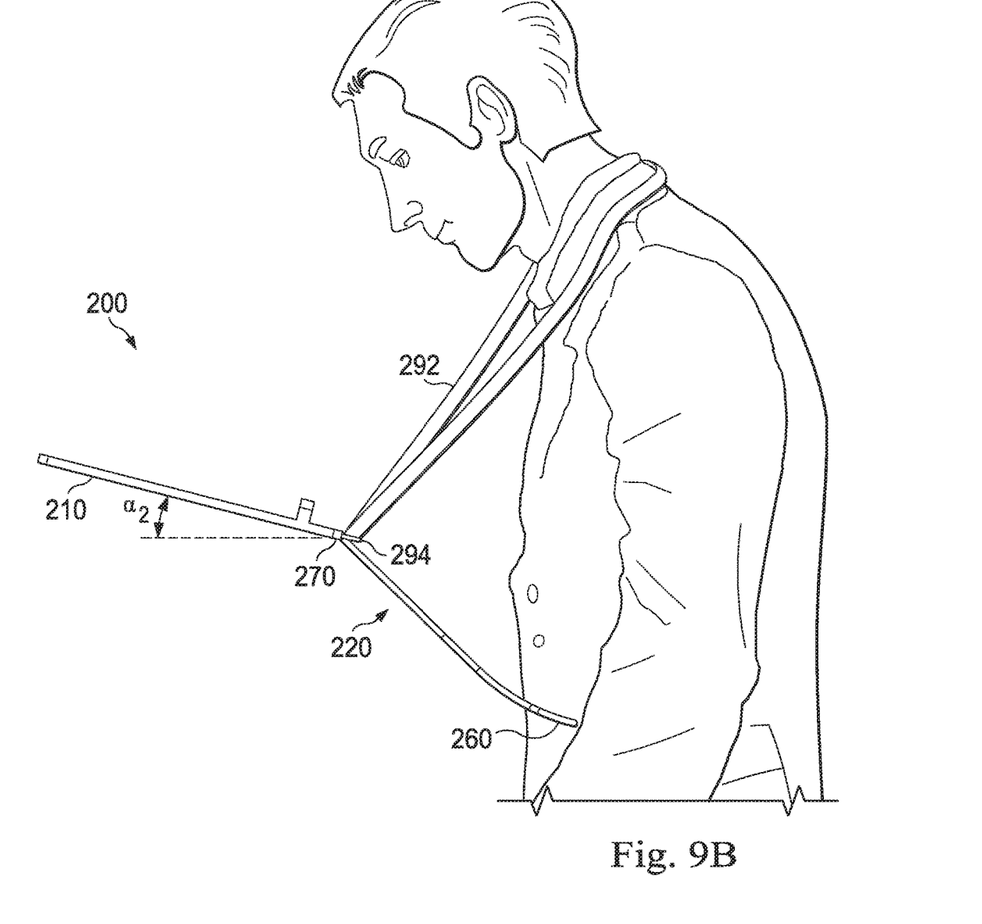
FIG. 9B illustrates an exemplary hinged platform apparatus held by a standing user in a second configuration.

The hinged platform apparatus 200 may be used by a standing user in various configurations which are illustrated in FIGS. 9A and 9B. For example, FIG. 9A shows the hinged platform apparatus 200 in a first standing configuration. In this example, the extension 220 may extend straight out from the base 210 and the hinge 270 may be locked so that the base 210 and the extension 220 are roughly coplanar. The slant of the hinged platform apparatus 200 with respect to a horizontal line may be measured by angle $\alpha_1$. In some implementations, this angle $\alpha_1$ may be adjusted by changing the configuration of the extension 220. For example, FIG. 9B shows the hinged platform apparatus 200 in a second standing configuration. In this example, the extension 220 has been moved so that the base 210 is closer to a vertical configuration than in FIG. 9A. Furthermore, the slant of the hinged platform apparatus 200 is less, and in some implementations, an angle $\alpha_2$ corresponding to the slant angle of the hinged platform apparatus 200 may be smaller than the angle $\alpha_1$.

FIG. 10 shows a hinged platform apparatus 200 that includes an exemplary clamp 300. The clamp 300 may be configured to secure an electronic device 170 or other object, such as a book or writing pad. Part of the clamp 300 may be contained within the base 210. The clamp 300 may fit within groves 310 disposed within the base 210. An actuator 320 may also be disposed within the base 210. In some implementations, the actuator 320 includes a spring 330 which may be configured to selectively contact the sides of the clamp 300. In some implementations, the clamp 300 may slide down the grooves 310 until the clamp 300 abuts against the electronic device 170. The clamp 300 may be configured to remain stationary in a secure position against the electronic device 170 until the actuator 320 is depressed, which may allow the clamp 300 to be moved upwards out of the base 210. This may allow the clamp 300 to securely hold the electronic device 170 and avoid accidental displacement of the electronic device 170.

The platforms as described herein offers advantages such as having variable flexibility, featuring a locking mechanism for added security in various configurations, being easily adjustable, and for providing hands-free support of an electronic device by a sitting, reclining, or standing user.

Persons of ordinary skill in the art will appreciate that the implementations encompassed by the present disclosure are not limited to the particular exemplary implementations described above. In that regard, although illustrative implementations have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. A platform apparatus for supporting electronic devices comprising:
    a base having a first end and a second end;
    a rest disposed on a front surface of the base adjacent to the first end and configured to contact an electronic device; and
    an extension comprising a proximal end and a distal end, wherein the proximal end of the extension connects to a lockable hinge connected to the first end of the base, such that the extension extends out from the base, the extension further comprising a relatively narrow upper portion and a relatively wider lower portion, wherein the relatively wider lower portion is wider than the relatively narrow upper portion and configured to contact a bottom portion of a user's thighs at the same time that the first end of the base contacts a top portion of a user's legs,
    wherein the extension is configured to act as a fulcrum to balance the platform apparatus against the user's legs, wherein the extension is lockable at a position such that the extension is positioned over the front surface of the base such that the distal end of the extension contacts the base adjacent the second end of the base.

2. The platform apparatus of claim 1, wherein the distal end of the extension curves forward and away from a longitudinal axis of the extension.

3. The platform apparatus of claim 1, wherein the base and the extension are formed from a material comprising wood, metal, or plastic.

4. A platform apparatus for supporting electronic devices comprising:
    a base having a first end and a second end;
    a rest disposed on the base adjacent to the first end and configured to contact an electronic device, the rest configured to contact a top portion of a user's legs;
    a lockable hinge connected to the first end; and
    an extension comprising a narrow neck and an end member wider than the neck, wherein the neck is connected to the lockable hinge and connected to the end member,
    wherein the extension is configured to act as a fulcrum to balance the platform apparatus against a user's legs, wherein the extension has a length that spaces the end member from the rest a distance permitting the end member to contact a bottom portion of a user's thighs and the rest to simultaneously contact the top portion of the user's legs, wherein the extension is lockable at a position such that the extension is positioned over a front surface of the base such that a distal end of the extension contacts the base adjacent the second end of the base.

5. The platform apparatus of claim 4, wherein the neck and the end member are formed from a same material.

6. The platform apparatus of claim 5, wherein the neck and the end member are formed from a single piece of metal.

7. The platform apparatus of claim 4, wherein the neck comprises two arcuate edges disposed on opposite sides of a longitudinal axis of the extension.

8. The platform apparatus of claim 7, wherein the arcuate edges curve outwards and away from the longitudinal axis.

9. The platform apparatus of claim 7, wherein lower portions of the arcuate edges curve forward and away from the longitudinal axis.

10. The platform apparatus of claim 4, further comprising a strap connected to the base.

11. The platform apparatus of claim 10, further comprising two connectors connected to the base, wherein the strap is secured to the connectors.

12. The platform apparatus of claim 4, wherein the lockable hinge further comprises a first inner member, a second inner member, a first casing, a second casing, and a third casing.

13. The platform apparatus of claim 12, wherein the first inner member is disposed within the first casing and secured by the third casing, wherein the second inner member is removably disposed within the second casing.

14. The platform apparatus of claim 12, wherein the first and second inner members have an exterior with a plurality of flat surfaces, the first and second inner members having a polygonal cross-section.

15. The platform apparatus of claim 12, wherein the lockable hinge is structurally arranged to be moved from a first configuration to a second configuration by compressing two arcuate edges of the neck together, releasing the second inner member from the second casing, rotating the first and second inner members from a first position to a second position, decompressing the two arcuate edges, and inserting the second inner member into the second casing.

16. The platform apparatus of claim 12, wherein the first and second casings have a cylindrical exterior and a hollow interior comprising a plurality of flat surfaces.

17. The platform apparatus of claim 16, wherein the first and second inner members have a hexagonal cross-section and the first and second casings have a hollow hexagonal interior.

18. A platform apparatus for supporting electronic devices comprising:
- a base having a lower end and an upper end opposite the lower end, the lower end and the upper end being spaced apart;
- a rest disposed on a front surface of the base adjacent to the lower end and configured to contact an electronic device;
- a lockable hinge comprising a first end, the first end of the lockable hinge connected to the lower end of the base; and
- an extension comprising a proximal end, a distal end, and a neck disposed between the proximal end and the distal end, the neck comprising two separate arcuate edges,
- wherein the proximal end is connected to the lockable hinge such that the extension is lockable at a plurality of positions in relation to the base,
- wherein both the distal end and the proximal end have a greater width than the neck,
- wherein the extension is lockable at a position such that the extension is positioned over the front surface of the base such that the distal end of the extension contacts the front surface of the base adjacent the upper end of the base.

19. The platform apparatus of claim 18, wherein lower portions of the two separate arcuate edges curve forward and away from a longitudinal axis of the extension.

20. The platform apparatus of claim 18, wherein the extension is lockable at a position such that the extension is positioned over the base such that the distal end of the extension contacts the base adjacent the upper end of the base.

* * * * *